Jan. 12, 1965  A. H. MÜLLER ETAL  3,165,259
ROTARY PISTON INTERNAL COMBUSTION ENGINE
Filed March 14, 1962
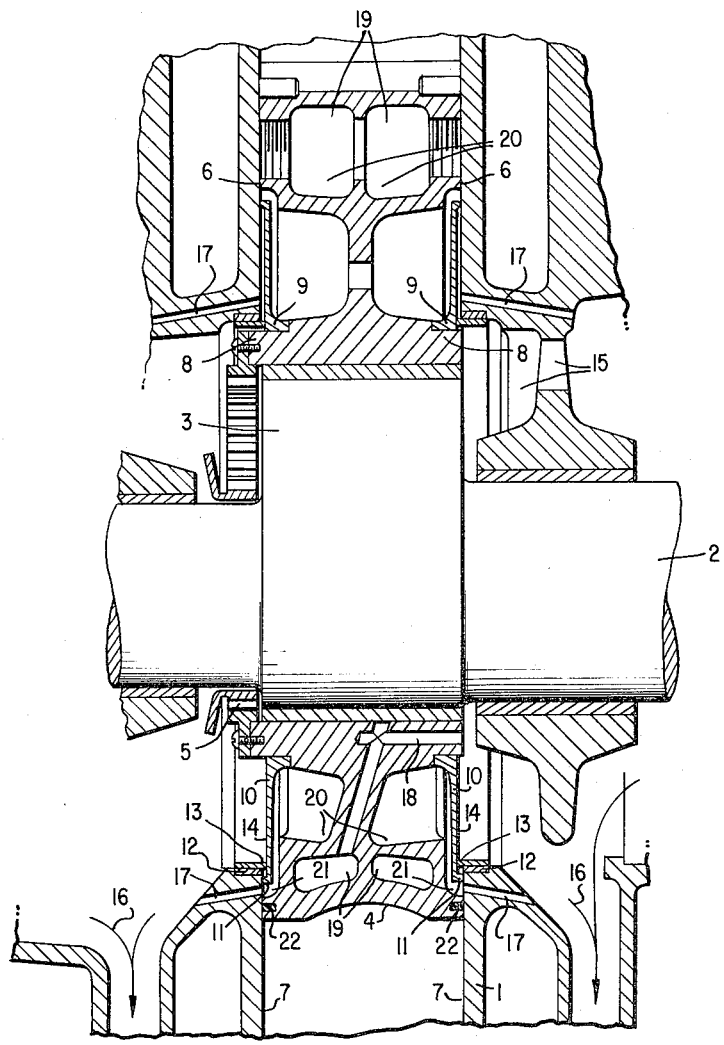
INVENTORS.
ALFRED H. MÜLLER
EBERHARD MÜLLER
BY
*Dicke and Craig*
ATTORNEYS.

United States Patent Office
3,165,259
Patented Jan. 12, 1965

3,165,259
ROTARY PISTON INTERNAL COMBUSTION ENGINE
Alfred H. Müller, Waiblingen, and Eberhard Müller, Esslingen - Mettingen, Germany, assignors to Daimler-Benz Aktiengesellschaft, Stuttgart-Unterturkheim, Germany
Filed Mar. 14, 1962, Ser. No. 179,740
Claims priority, application Germany Mar. 22, 1961
11 Claims. (Cl. 230—207)

The present invention relates to an oil seal disposed between the end walls of the piston and the lateral walls of the housing of rotary piston internal combustion engines, particularly of internal combustion engines of trochoidal construction, and consists essentially in providing metallic sealing disks between the end walls of the piston and the lateral walls of the housing, which sealing disks are connected radially inwardly thereof for common rotation with the piston, preferably with hub portions of the piston, and which are equipped radially outwardly thereof, preferably along a large diameter, with a sealing edge portion which sealingly abuts in the axial direction against the lateral wall of the housing.

A very effective oil seal is obtained with the present invention inasmuch as the sealing disks may be constructed in a membrane-like manner and an axial initial or prestress of any desired magnitude may be imparted thereto so that the contact or abutment pressure of the sealing edge portions against the lateral walls of the housing is adapted to be varied within wide limits.

The sealing disks, which may preferably be provided radially inwardly thereof with an axially projecting mounting flange, may have a wall thickness decreasing radially from the inside toward the outside thereof so as to increase the membrane-like effect of the sealing disks. The spring characteristics of the sealing disks may thereby be so chosen that a very elastic, intimate contact of the sealing disks can be achieved.

The surfaces of the sealing disks facing the lateral walls of the housing may be arranged so as to be parallel to the lateral housing walls. Furthermore, lip-type seals made of elastic material may be provided along the lateral housing walls which rest with their sealing lips against the surfaces of the sealing disks facing the lateral walls of the housing. The largest portion of the occurring oil may be removed from the sealing disks by means of the sealing lips so that only the portion of the oil which is not retained by the sealing lips has to be retained by the sealing edges of the sealing disks.

The sealing disks may be disposed advantageously in front of annular chambers disposed within the piston, and the sealing disks may cover these annular chambers except for an outer annular gap or slot. In a rotary piston internal combustion engine in which the piston is supported on an eccentric arranged on the driven shaft, ventilation and oil discharge bores are provided within the lateral walls of the housing through which any retained oil may flow off, and which, in the eccentric position of the piston, will be in communication with the annular chambers or spaces in the piston through the annular gaps or slots formed by the sealing disks. Ventilation and oil discharge bores serve, at that moment for the purpose of ventilation of the annular hollow chambers or spaces in the piston. Air and combustion gases flowing into these hollow chambers through leaks in the gas seals may be drawn off or conducted away in this manner. Any oil which may possibly accumulate within the hollow spaces or chambers may also be drained off in that manner.

Accordingly, it is an object of the present invention to provide an oil seal for rotary-piston internal combustion engines, especially for rotary-piston internal combustion engines of trochoidal construction, which provides, by simple means, a highly efficient oil seal between the lateral walls of the engine housing and the end faces of the piston.

It is another object of the present invention to provide an oil seal of the type described hereinabove for a rotary-piston internal combustion engine which by reason of a membrane-like construction permits a wide variation in the abutment pressure that can be achieved thereby.

A further object of the present invention resides in the provision of an oil seal construction between the lateral housing walls and the piston end faces of rotary piston internal combustion engines in which an extremely elastic sealing abutment can be realized.

Still a further object of the present invention is the provision of a membrane-like oil seal of disk-like construction for rotary-piston internal combustion engines of trochoidal construction which simultaneously is effective as valving means for the ventilation and oil discharge bores in communication with hollow chambers and spaces provided within the piston.

These and other objects, features and advantages of the present invention will become more obvious from the following description when taken in connection with the accompanying drawing which shows, in the single figure thereof, for purposes of illustration only, a longitudinal cross sectional view through one embodiment of a rotary-piston internal combustion engine of trochoidal construction provided with an oil seal in accordance with the present invention.

Referring now to the single figure of the drawing, the driven shaft 2 is suitably supported within the engine housing 1. The piston 4 of the internal combustion engine is rotatably supported on the eccentric 3 of the driven shaft 2 and is controlled in its rotary movements by any known, conventional transmission means 5.

In order to prevent that oil coming from the bearings of the driven shaft 2 within the housing 1 and from the bearing of the piston 4 on the eccentric 3 reaches or flows between the piston end walls 6 and the lateral housing walls 7 into the chambers formed by the piston and the housing, which serve for carrying out the combustion process, the sealing disks 10 provided with axial mounting flanges 9 are arranged on the hub portions 8 on both sides of the piston 4.

The sealing disks 10 are constructed in a membrane-like manner. Their wall thickness decreases progressively from the flanges 9 in a radially outward direction. Sealing edges 11 provided at the outer rim of the sealing disks 10 and pointing in the axial direction abut sealingly against the machined lateral housing walls 7, while lip-type seals 12 arranged at the lateral housing walls 7, made of elastic material, abut with the sealing lips 13 thereof against the surfaces 14 of the sealing disks 10. Apertures 15 for the discharge of oil are provided radially inwardly of the lip-type seals 12 within the lateral housing walls 7, which discharge takes place in the direction of arrow 16. Moreover, the ventilating and oil discharge bores 17 are provided within the lateral housing walls 7 radially outwardly of the lip-type seals 12. The bore 18 additionally terminates radially inwardly of the lip-type seal 12 in a piston end wall 6 within the area of the hub portion 8 of the piston. Cooling oil which leaves the cooling chambers or spaces 19 disposed within the piston 4 may flow off through bore 18.

Between the cooling chambers 19 and the hub portions 8 of the piston 4 are disposed annular chambers or spaces 20 which are covered by the sealing disks 10 in the axial direction against the lateral housing walls 7 except for the radially outwardly disposed annular slot or gap 21. If the piston is disposed in the eccentric position thereof, as illustrated in the drawing, then a part of the ventilating and oil discharge bores 17 is disposed outside of the area of the sealing disks 10 and thereby permits ventilation of the annular chambers 20 and the removal of any possibly accumulated oil through the annular slot or gap 21 into the oil discharge.

During operation of the internal combustion engine, the lip-type seals 12 wipe off in a far-reaching manner from the sealing disks 10 lubricating oil dripping from the bearings of the driven shaft 2 and from the bearing of piston 4, and cooling-oil flowing off from the piston 4 so that this oil reaches the oil discharge through the openings 15 in the housing walls 7. Any oil not held back by the lip-type seals 12 is seized by the sealing edge portions 11 of the sealing disks 10 and is pressed or forced into the oil discharge through the ventilating and oil discharge bores 17 as well as through the lip-type seal 12, which does not produce a sealing effect in the direction toward the center of the shaft.

If the piston 4 is so positioned that some of the ventilating and oil discharge bores 17 are outside of the sealing edge portions 11, then the annular chambers or spaces 20 within the piston are ventilated thereby. Gases which have entered the annular chamber 20 due to leakages in the gas seals 22 may also escape through the oil discharge bores 17 via the annular gap or slot 21. The same applies to any oil which might have accumulated in the annular chambers 20.

While we have shown and described one embodiment in accordance with the present invention, it is understood that the same is not limited thereto, but is susceptible of many changes and modifications within the spirit and scope thereof, and we therefore do not wish to be limited to the details shown and described herein, but intend to cover all such changes and modifications as are encompassed by the scope of the appended claims.

We claim:

1. An oil seal construction disposed between the piston end walls and the lateral housing walls of rotary-piston internal combustion engines, especially of internal combustion engines of trochoidal construction, comprising engine housing means including lateral housing walls, piston means including end walls and provided with hub portions, and metallic sealing disk means disposed between said piston end walls and said lateral housing walls and operatively connected radially inwardly thereof for common rotation with the hub portions of the piston means, said sealing disk means being provided at the radial edges thereof on a relatively large diameter with sealing edge means sealingly abutting substantially in the axial direction against said lateral housing walls, and the wall thickness of said sealing disk means decreasing progressively in the radially outward direction.

2. An oil seal construction disposed between the piston end walls and the lateral housing walls of rotary piston internal combustion engines, especially of internal combustion engines of trochoidal construction, comprising engine housing means including lateral housing walls, piston means including end walls and hub portions, and metallic sealing disk means disposed between said piston end walls and said lateral housing walls, said sealing disk means being provided radially inwardly thereof with substantially axially projecting securing flange means and being connected radially inwardly with said securing flange means to the hub portions of said piston means for common rotation therewith, said sealing disk means being provided radially outwardly thereof on a relatively large diameter with sealing edge means sealingly abutting substantially in the axial direction against said taken housing walls and being constructed with wall thicknesses that decrease progressively from the radially inwardly disposed portions to the radially outwardly disposed portions.

3. An oil seal construction disposed between the piston end walls and the lateral housing walls of rotary piston internal combustion engines, especially of internal combustion engines of trochoidal construction, comprising engine housing means including lateral housing walls, piston means including end walls and hub portions, and metallic sealing disk means disposed between said piston end walls and said lateral housing walls, said sealing disk means being connected radially inwardly to the hub portions of said piston means for common rotation therewith, said sealing disk means being provided radially outwardly thereof on a relatively large diameter with sealing edge means sealingly abutting substantially in the axial direction against said lateral housing walls and being constructed with wall thicknesses that decrease progressively from the radially inwardly disposed portions to the radially outwardly disposed portions, the surfaces of said sealing disk means facing the lateral housing walls being disposed substantially parallelly thereto.

4. An oil seal construction disposed between the piston end walls and the lateral housing walls of rotary piston internal combustion engines, especially of internal combustion engines of trochoidal construction, comprising engine housing means including lateral housing walls, piston means including end walls and hub portions, and metallic sealing disk means disposed between said piston end walls and said lateral housing walls, said sealing disk means being connected radially inwardly to the hub portions of said piston means for common rotation therewith, said sealing disk means being provided radially outwardly thereof on a relatively large diameter with sealing edge means sealingly abutting substantially in the axial direction against said lateral housing walls and being constructed with wall thicknesses that decrease progressively from the radially inwardly disposed portions to the radially outwardly disposed portions, the surfaces of said sealing disk means facing the lateral housing walls being disposed substantially parallelly thereto, and lip-type seal means made of elastic material and arranged at said lateral housing walls which abut with the sealing lips thereof against the surfaces of said sealing disk means facing said lateral housing walls.

5. An oil seal construction disposed between the piston end walls and the lateral housing walls of rotary piston internal combustion engines, especially of internal combustion engines of trochoidal construction, comprising engine housing means including lateral housing walls, piston means including end walls and hub portions, said piston means being also provided with annular space means and said lateral housing walls being provided with ventilation and oil discharge bore means, and metallic sealing disk means disposed between said piston end walls and said lateral housing walls, said sealing disk means being connected radially inwardly to the hub portions of said piston means for common rotation therewith, said sealing disk means being provided radially outwardly thereof on a relatively large diameter with sealing edge means sealingly abutting substantially in the axial direction against said lateral housing walls and being constructed with wall thicknesses that decrease progressively from the radially inwardly disposed portions to the radially outwardly disposed portions, the surfaces of said sealing disk means facing the lateral housing walls being disposed substantially parallelly thereto, and lip-type seal means made of elastic material and arranged at said lateral housing walls which abut with the sealing lips thereof against the surfaces of said sealing disk means facing said lateral housing walls, said sealing disk means being located in front of said annular space means and effectively covering the same except for an outer annular gap means.

6. An oil seal construction disposed between the piston end walls and the lateral housing walls of rotary piston internal combustion engines, especially of internal combustion engines of trochoidal construction, comprising engine housing means including lateral housing walls, output shaft means provided with eccentric means, piston means supported on said eccentric means and including end walls and hub portions, said piston means being also provided with annular space means and said lateral housing walls being provided with ventilation and oil discharge bore means, and metallic sealing disk means disposed between said piston end walls and said lateral housing walls, said sealing disk means being provided radially inwardly thereof with substantially axially projecting securing flange means and being connected radially inwardly with said securing flange means to the hub portions of said piston means for common rotation therewith, said sealing disk means being provided radially outwardly thereof on a relatively large diameter with sealing edge means sealingly abutting substantially in the axial direction against said lateral housing walls and being constructed with wall thicknesses that decrease progressively from the radially inwardly disposed portions to the radially outwardly disposed portions, the surfaces of said sealing disk means facing the lateral housing walls being disposed substantially parallelly thereto, and lip-type seal means made of elastic material and arranged at said lateral housing walls which abut with the sealing lips thereof against the surfaces of said sealing disk means facing said lateral housing walls, said sealing disk means being located in front of said annular space means and effectively covering the same except for an outer annular gap means, said ventilation and oil discharge bore means being in communication with said annular space means through said annular gap means effectively formed by said disk means with said piston means in the eccentric position thereof.

7. An oil seal construction disposed between the piston end walls and the lateral housing walls of rotary piston internal combustion engines, especially of internal combustion engines of trochoidal construction, comprising engine housing means including lateral housing walls, piston means including end walls and sealing means disposed between said piston end walls and said lateral housing walls, said sealing disk means being connected radially inwardly to said piston means for common rotation therewith, said sealing disk means being provided radially outwardly thereof with sealing edge means sealingly abutting substantially in the axial direction against said lateral housing walls, and lip-type seal means made of elastic material and arranged at said lateral housing walls which abut with the sealing lips thereof against the surfaces of said sealing disk means facing said lateral housing walls.

8. In a rotary-piston internal combustion engine, especially of trochoidal construction, having engine housing means including lateral housing walls, driven shaft means, piston means rotatably supported on said shaft means and provided with end walls and with hollow chambers, said lateral housing walls being provided with discharge bore means, the improvement essentially consisting of membrane-like seal means disposed between said lateral housing walls and said piston end walls, said seal means being effectively operative also as valving means for the communication between the hollow chambers in said piston means and the discharge bore means during relative rotation of said piston means to said housing means.

9. An oil seal construction disposed between the piston end walls and the lateral housing walls of rotary piston internal combustion engines, especially of internal combustion engines of trochoidal construction, comprising engine housing means including lateral housing walls, piston means including end walls, said piston means being also provided with annular space means and said lateral housing walls being provided with ventilation and oil discharge bore means, and sealing means disposed between said piston end walls and said lateral housing walls, said sealing disk means being connected radially inwardly to said piston means for common rotation therewith, said sealing disk means being provided radially outwardly thereof with sealing edge means sealingly abutting substantially in the axial direction against said lateral housing walls, said sealing disk means being located in front of said annular space means and effectively covering the same except for an outer annular gap means.

10. An oil seal construction disposed between the piston end walls and the lateral housing walls of rotary piston internal combustion engines, especially of internal combustion engines of trochoidal construction, comprising engine housing means including lateral housing walls, output shaft means provided with eccentric means, piston means supported on said eccentric means and including end walls, said piston means being also provided with annular space means and said lateral housing walls being provided with ventilation and oil discharge bore means, and sealing means disposed between said piston end walls and said lateral housing walls, said sealing disk means being connected radially inwardly to said piston means for common rotation therewith, said sealing disk means being provided radially outwardly thereof with sealing edge means sealingly abutting substantially in the axial direction against said lateral housing walls, said sealing disk means being located in front of said annular space means and effectively covering the same except for an outer annular gap means, said ventilation and oil discharge bore means being in communication with said annular space means through said annular gap means effectively formed by said disk means with said piston means in the eccentric position thereof.

11. In a rotary-piston internal combustion engine, especially of trochoidal construction, having engine housing means including lateral housing walls, driven shaft means provided with eccentric means, piston means rotatably supported on the eccentric means of said shaft means and provided with end walls and with hollow chambers, said lateral housing walls being provided with discharge bore means, the improvement essentially consisting of membrane-like seal means disposed between said lateral housing walls and said piston end walls, said seal means being effectively operative also as valving means for the communication between the hollow chambers in said piston means and the discharge bore means during relative rotation of said piston means to said housing means to establish such communication with said piston in the eccentric postion.

References Cited in the file of this patent

UNITED STATES PATENTS

| | | |
|---|---|---|
| 1,569,751 | Higgins | Nov. 20, 1922 |
| 1,952,274 | Mitchell | Mar. 27, 1934 |
| 2,231,947 | Rich | Feb. 18, 1941 |
| 2,418,707 | Groot | Apr. 8, 1947 |
| 2,736,265 | Higgins | Feb. 28, 1956 |
| 3,064,880 | Wankel | Nov. 20, 1962 |

FOREIGN PATENTS

| | | |
|---|---|---|
| 628,212 | Canada | Sept. 28, 1959 |
| 1,123,765 | France | Sept. 27, 1956 |
| 695,855 | Great Britain | Feb. 29, 1952 |